(12) United States Patent
Chang

(10) Patent No.: US 6,970,643 B2
(45) Date of Patent: Nov. 29, 2005

(54) RADIATOR HAVING A FAN IN VARIABLE ROTATION SPEED

(75) Inventor: Wei-Chun Chang, Taipei Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 10/710,364

(22) Filed: Jul. 4, 2004

(65) Prior Publication Data
US 2005/0109491 A1 May 26, 2005

(51) Int. Cl.⁷ .................................................. H02P 5/00
(52) U.S. Cl. ................ 388/800; 388/806; 388/815; 388/822; 388/934; 318/471; 318/472; 318/461
(58) Field of Search ............................... 388/800, 806, 388/815, 934, 915; 318/471–473, 254

(56) References Cited

U.S. PATENT DOCUMENTS

| | | | | |
|---|---|---|---|---|
| 3,801,888 A | * | 4/1974 | Faulkner | 318/471 |
| 4,313,402 A | * | 2/1982 | Lehnhoff et al. | 123/41.12 |
| 5,457,766 A | * | 10/1995 | Ko | 388/831 |
| 5,942,866 A | * | 8/1999 | Hsieh | 318/268 |
| 6,182,902 B1 | * | 2/2001 | Shih | 236/35 |
| 6,407,525 B1 | * | 6/2002 | Horng et al. | 318/473 |
| 6,674,369 B1 | * | 1/2004 | Riddoch | 340/648 |

* cited by examiner

Primary Examiner—Rina Duda
(74) Attorney, Agent, or Firm—Winston Hsu

(57) ABSTRACT

A radiator includes a voltage regulator for providing a reference voltage, a fan including a power end connected to the reference voltage via a first resistor and a feedback end for outputting a pulse signal indicating the rotation speed of the fan, an integration circuit including an output end, and an input end connected to the feedback end of the fan for converting the pulse signal from the feedback end into a voltage signal, and a thermistor connected between the output end of the integration circuit and the reference voltage, for detecting temperature changes in order to adjust the rotation speed of the fan.

5 Claims, 4 Drawing Sheets

RADIATOR HAVING A FAN IN VARIABLE ROTATION SPEED

BACKGROUND OF INVENTION

1. Field of the Invention

The present invention relates to a radiator, and more specifically, to a radiator having a fan in variable rotation speed.

2. Description of the Prior Art

Common radiators include cooling fins and fans. Most of the cooling fins are composed of aluminum alloy while a small number uses other materials, but all of them have almost the same heat conductivity. Besides composing materials, the performance of a cooling fin depends also on its surface area. A cooling fin conducts heat to its surface so that the air can bring the heat away, thus the larger the surface area is, the better the performance of the cooling fin is. However, the cooling fin does not work well if the air flow is insufficient even if it has a large surface area, thus for a better performance, a fan promoting air flow is necessary. Generally, the higher the rotation speed, the better the performance of the fan. That is because the fan accelerates the air flow in high rotation speed so that the air can bring more heat away. The rotation speed of the fan can be known by its power consumption. A fan consuming more power rotates faster.

Please refer to FIG. 1 showing a conventional radiator 10. The radiator 10 includes a thermal sensor 12, a microcontroller 14, a driver circuit 16 and a fan 18. The interconnection between devices of the radiator 10 is shown in FIG. 10. Generally the radiator 10 is installed in a system, the thermal sensor 12 is for sensing the temperature of the system, the microcontroller 14 compares the temperature sensed by the thermal sensor 12 with a predetermined temperature, and the driver circuit 16 turns on the fan when the temperature sensed by the thermal sensor 12 exceeds the predetermined temperature. The driver circuit 16 can output different voltages according to the requirements by the microcontroller 14 to control the rotation speed of the fan 18, and the fan 18 has a signal line connected to the driver circuit 16 for outputting a speed signal of the fan 18. Whenever the thermal sensor 12 senses a temperature raising, the microcontroller 14 requires the driver circuit 16 to speed up the fan 18, so that the driver circuit 16 raises up the output voltage to the fan 18, and when the speed of the fan 18 is raised up, the signal line transmits the speed signal back to the driver circuit 16. And if the thermal sensor 12 senses a decrease in temperature, the speed of the fan 18 should be lowered down to conserve power, so that the microcontroller 14 requires the driver circuit 16 to lower down the output voltage to the fan 18, and the driver circuit 16 knows the speed of the fan 18 by the signal line.

As mentioned above, the conventional radiator capable of controlling the rotation speed of the fan 18 uses the thermal sensor 12 to sense the environmental temperature, the microcontroller 14 compares the temperature sensed by the thermal sensor 12 with the predetermined temperature and requires the driver circuit 16 to control the speed of the fan, and the driver circuit 16 to compare the feedback speed signal of the fan 18 with the speed signal required by the microcontroller 14 in order to control the output voltage to the fan 18 to change its rotation speed, so that the speed of the fan 18 can be adjusted according to the environmental temperature. However, the radiator 10 requires the thermal sensor 12, the microcontroller 14 and the driver circuit 16 which raise the cost. In addition, the temperature comparison by the microcontroller 14 and the rotation speed comparison by the driver circuit 16 also lower down the sensibility of the radiator 10.

SUMMARY OF INVENTION

It is therefore a primary objective of the present invention to provide a radiator having a fan with variable rotation speed in order to solve the problems mentioned above.

Briefly summarized, a radiator includes a voltage regulator for providing a reference voltage, a fan including a power end connected to the reference voltage via a first resistor and a feedback end for outputting a pulse signal indicating the rotation speed of the fan, an integration circuit including an output end, and an input end connected to the feedback end of the fan for converting the pulse signal from the feedback end into a voltage signal, and a thermistor connected between the output end of the integration circuit and the reference voltage, for detecting temperature change in order to adjust the rotation speed of the fan.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
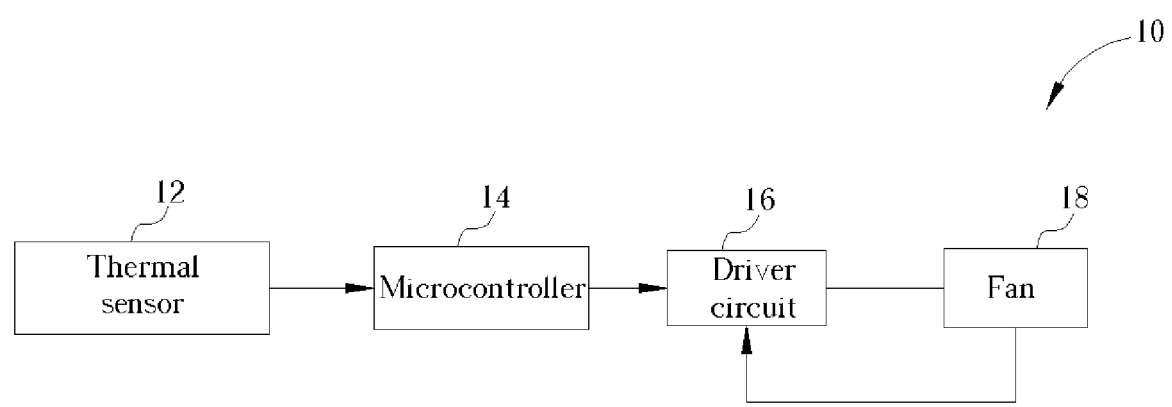
FIG. 1 illustrates a conventional radiator.
Figure 2:
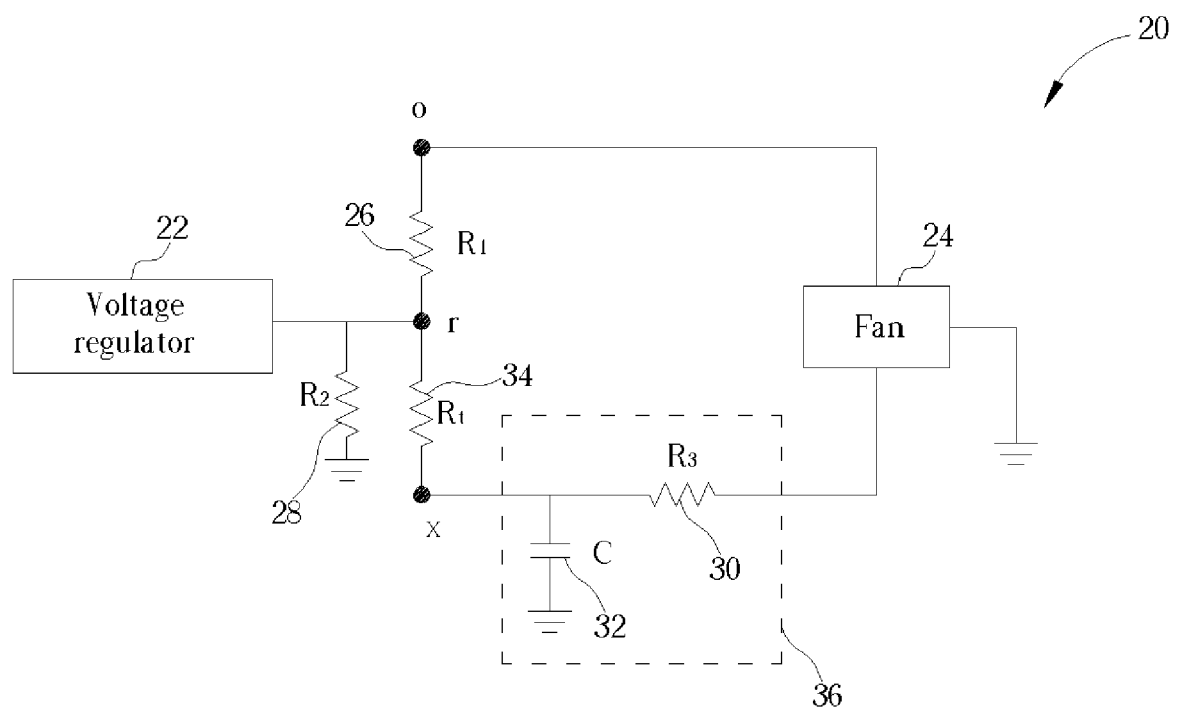
FIG. 2 is a circuit diagram of a radiator according to the present invention.

Please refer to FIG. 2 showing a circuit diagram of a radiator 20 according to the present invention. The radiator 20 includes a voltage regulator 22, a fan 24, a first resistor 26, a second resistor 28, a third resistor 30, a capacitor 32 and a thermistor 34. The interconnection of these devices is shown in FIG. 2. An output end of the voltage regulator 22 provides a stable reference voltage, first ends of the first resistor 26, the second resistor 28 and the thermistor 34 are connected to the output end of the voltage regulator 22, and a second end of the second resistor 28 is grounded for providing a stable current. The fan 24 has a power end, a ground end and a feed back end, a second end of the first resistor 26 is connected to the power end of the fan 24 for providing operational voltage to the fan 24. A first end of the third resistor 30 is connected to a first end of the capacitor 32, and a second end of the capacitor 32 is grounded to form an integration circuit 36. An output end of the integration circuit 36 is the first end of the third resistor 30 connected to a second end of the thermistor 34, and an input end of the integration circuit 36 is a second end of the third resistor 30 connected to the feedback end of the fan 24. A speed pulse signal of the fan 24 outputted by the integration circuit 36 becomes direct current (DC) voltage. On node r in FIG. 2, a formula can be obtained according to Kirchhoff's current law (KCL):

$$(Vo-Vr)/R1+(Vx-Vr)/Rt-Vr/R2=0 \qquad \text{formula (1)}$$

Vo, Vr, Vx are voltages of node o, r and x. Vo is an input voltage of the fan 24, Vr is an output voltage of the voltage regulator 22, Vx is a feedback voltage output by the integration circuit 36. R1, Rt, R2 are resistances of the first resistor 26, the thermistor 34 and the second resistor 28. Under a fixed temperature, Rt is also fixed so that formula (1) can be simplified as follows:

$$Vo=(1+R1/Rt+R1/R2)Vr-(R1/Rt)Vx \quad \text{formula (2)}$$

If the rotation speed of the fan 24 is fixed, Vx is also fixed so that formula (1) can be simplified as follows:

$$Vo=(1+R1/R2)Vr-(R1/Rt)(Vx-Vr) \quad \text{formula (3)}$$

Figure 3:
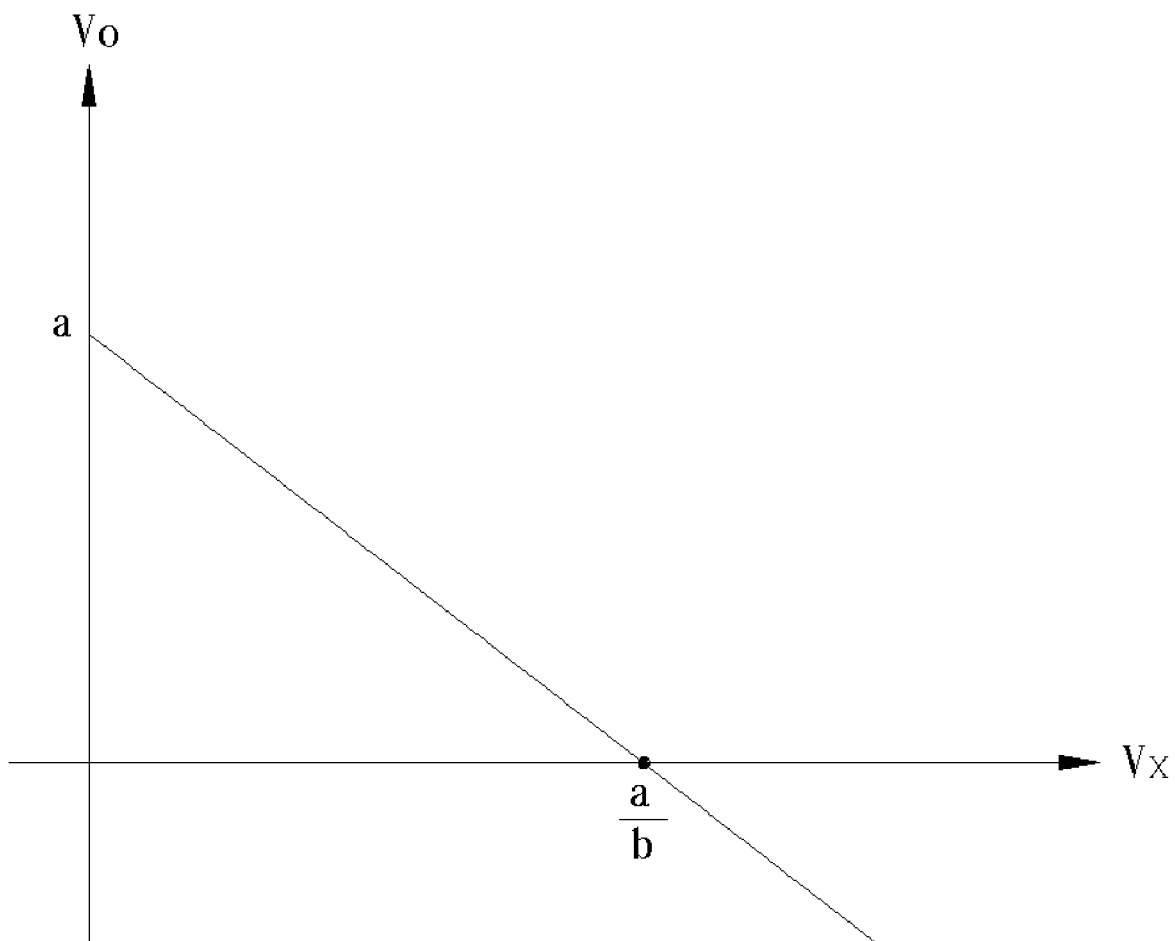
FIG. 3 illustrates the relationship between Vo and Vx.
Figure 4:
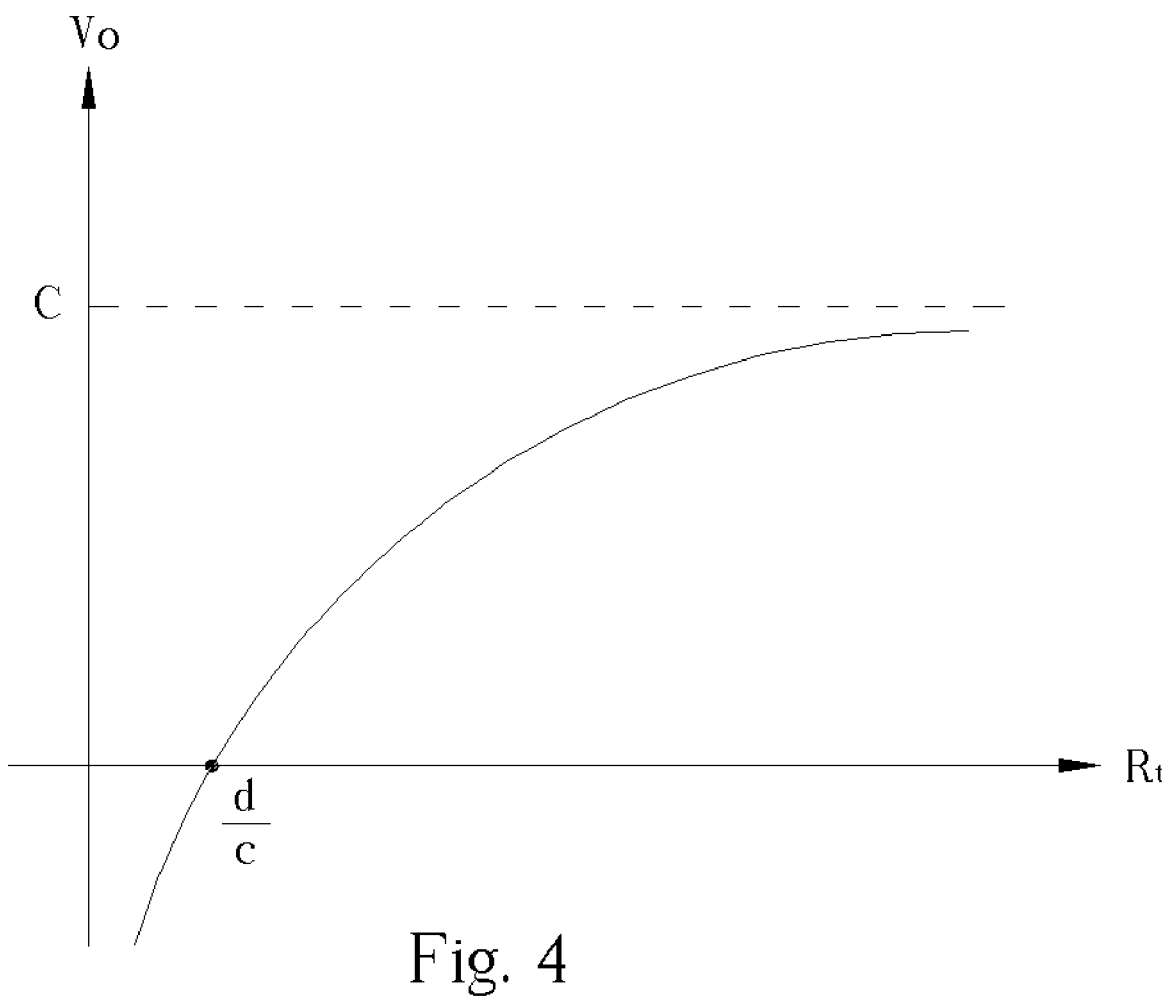
FIG. 4 illustrates the relationship between Vo and Rt.

Please refer to FIG. 3 showing the relationship between Vo and Vx, and FIG. 4 showing the relationship between Vo and Rt. Under a fixed temperature, Rt is also fixed and formula (2) has only two variables, which are Vo and Vx, while other parameters can be regarded as constants. Define a=(1+R1/Rt+R1/R2)Vr, b=(R1/Rt), and formula (2) can be simplified as Vo=a−bVx. The relationship between Vo and Vx is shown in FIG. 3, when Vo increases, Vx decreases, that means when the fan 24 rotates fast, the feedback end of the fan 24 will output pulse signals in longer period and a smaller voltage will output the integration circuit 36, and when the fan 24 rotates slowly, the feedback end of the fan 24 will output pulse signals in shorter period and a larger voltage will output the integration circuit 36. In such a manner the relationship between the rotation speed of the fan 24 and the output signal from the feedback end can be known. And if the rotation speed of the fan 24 is fixed, Vx is also fixed so that formula (3) has only two variables, which are Vo and Rt, while other parameters can be regarded as constants. Define c=(1+R1/R2)Vr, d=R1(Vx−Vr), and formula (3) can be simplified as Vo=c−d/Rt. The relationship between Vo and Rt is shown in FIG. 4, when Rt increases, Vo also increases, that means the resistance of the thermistor 34 increases according to the temperature, because the fan 24 speeds up when Vo increases. In such a manner the relationship between the thermistor 34 and the temperature can be known. FIG. 3 and FIG. 4 indicate the characteristics of the fan 24 and the thermistor 34 of the radiator 20. First, the pulse signals from the feedback end of the fan 24 decreases when the rotation speed increases. Second, the resistance of the thermistor 34 increases according to the temperature.

The operation of the radiator 20 is described as follows. The radiator 20 is installed in a system in order to keep the temperature T of the system in a reasonable range. When the radiator is activated, the voltage regulator 22 provides the reference voltage Vr, and the input voltage Vo1 of the fan 24 is generated. The speed signal Vx1 of the fan 24 can be obtained by formula (2), and the initial temperature T0 of the system determines the resistance Rt0 of the thermistor 34. The input voltage Vo2 of the fan 24 can be obtained by formula (3), and under the initial temperature T0. The speed signal Vx2 of the fan 24 can be obtained by formula (2), and the input voltage Vo2 of the fan 24 keeps the fan 24 rotate in a fixed speed. When the system operates, the temperature rises from T0 to T1, and accordingly, the resistance of the thermistor 34 rises from Rt0 to Rt1. By formula (3) we can know Vo2>Vo1, so that the input voltage of the fan 24 rises from Vo1 to Vo2, that means the fan 24 rotates faster, and by formula (2) we know Vx2<Vx1. After the fan 24 is accelerated for a while, the temperature of the system falls down from T1 to T0, and accordingly the resistance of the thermistor 34 falls down from Rt2 to Rt1, and the input voltage of the fan 24 falls down to Vo1, the speed signal of the fan 24 returns to Vx1. After the fan 24 lowers down, since the system keeps on operating, the temperature rises again after a period of time. With such kind of operation, the system can be prevented from overheating and the efficiency of the fan 24 is also increased. As mentioned above, the flow of the operation is as follows: T increases=>Rt increases=>Vo increases=>Vx decreases= >T decreases=>Rt decreases=>Vo decreases= >Vx increases=>T increases The resistance increase of the thermistor 34 according to the temperature is analog. Whenever the resistance rises up or falls down, the input voltage of the fan 24 will changes accordingly so that the rotation speed of the fan 24 changes precisely according to the temperature. However, if the thermistor 34 reacts only when a larger temperature change occurs, the input voltage of the fan 24 and the speed signal will keep balance by formula (2).

As described above, the radiator 20 uses the thermistor 34 for sensing the temperature, and since the thermistor 34 changes its resistance according to the temperature, the input voltage of the fan 24 can be changed according to the temperature in order to have the fan 24 rotate in different speeds according to different temperatures. In the present invention, the radiator 20 uses the thermistor 34 with its resistance increasing according to the temperature, and the fan 24 with the feedback end. The feedback end of the fan 24 lowers the pulse signal down when the rotation speed increases, and the integration circuit 36 puts the pulse signal as the feedback voltage out. By the first resistor 26 and the second resistor 28, the input voltage of the fan 24 changes according to the feedback voltage. When the temperature rises up, the input voltage of the fan 24 also rises up so that the fan 24 rotates faster for better heat dissipation. When the temperature goes down, the input voltage of the fan 24 lowers down so that the fan 24 rotates slower in order to conserve power.

In contrast to the prior art, the radiator, according to the present invention, utilizes the thermistor with resistance changing according to the temperature to change the input voltage of the fan according to the temperature, so that the fan rotates faster as the temperature increases. On the other hand, the conventional radiator requires the thermal sensor, the microcontroller and the driver circuit and also changes the rotation speed by comparing the temperature with the rotation speed. These active devices not only increase the cost, but also raise the probability of misjudgment. The radiator, according to the present invention, uses low cost passive devices such as the resistor and the capacitor. Furthermore, the thermistor changes its resistance according to the temperature by its own material characteristics, so that misjudgment may not be done.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A radiator comprising:
   a voltage regulator for providing a reference voltage;
   a fan comprising a power end connected to the reference voltage via a first resistor, and a feedback end for outputting a pulse signal indicating the rotation speed of the fan;
   an integration circuit comprising an output end, and an input end connected to the feedback end of the fan, for converting the pulse signal from the feedback end into a voltage signal; and a thermistor connected between the output end of the integration circuit and the reference voltage, for detecting temperature change in order to adjust the rotation speed of the fan.

2. The radiator of claim 1 further comprising a second resistor with a first end connected to the reference voltage, and a grounded second end.

3. The radiator of claim 1 wherein the integration circuit is composed of a third resistor with a first end being an output end of the integration circuit and a second end being an input end of the integration circuit, and a capacitor with a first end connected to the first end of the third resistor and a second end grounded.

4. The radiator of claim 1 wherein the resistance of the thermistor increases according to the temperature.

5. The radiator of claim 4 wherein the pulse signal from the feedback end decreases when the rotation speed of the fan lowers down.

* * * * *